US010784714B2

(12) United States Patent
Mouridsen et al.

(10) Patent No.: US 10,784,714 B2
(45) Date of Patent: Sep. 22, 2020

(54) 3 PHASE UPS BUS BALANCER

(71) Applicant: SCHNEIDER ELECTRIC IT CORPORATION, West Kingston, RI (US)

(72) Inventors: Jonas Sonsby Mouridsen, Odense V (DK); Carsten Nommensen Tingskov, Fredericia (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 120 days.

(21) Appl. No.: 16/206,229

(22) Filed: Nov. 30, 2018

(65) Prior Publication Data

US 2020/0177020 A1  Jun. 4, 2020

(51) Int. Cl.
| | |
|---|---|
| H02J 9/06 | (2006.01) |
| H02J 7/00 | (2006.01) |
| H02M 7/00 | (2006.01) |
| H02J 1/10 | (2006.01) |
| H02M 5/40 | (2006.01) |
| H02M 1/42 | (2007.01) |

(52) U.S. Cl.
CPC ............. *H02J 9/062* (2013.01); *H02J 1/102* (2013.01); *H02J 7/0014* (2013.01); *H02M 1/4208* (2013.01); *H02M 5/40* (2013.01); *H02M 7/003* (2013.01)

(58) Field of Classification Search
None
See application file for complete search history.

(56) References Cited

U.S. PATENT DOCUMENTS

| | | | |
|---|---|---|---|
| 9,979,313 B2 | 5/2018 | Mouridsen | |
| 10,211,672 B2 | 2/2019 | Mouridsen | |
| 10,277,067 B2 | 4/2019 | Mouridsen | |
| 10,439,512 B1 | 10/2019 | Mouridsen | |
| 10,491,137 B2 | 11/2019 | Mouridsen | |
| 2004/0222754 A1* | 11/2004 | Ochiai | H02P 1/54 318/105 |

(Continued)

FOREIGN PATENT DOCUMENTS

CN   108418440 A   8/2018

OTHER PUBLICATIONS

Extended European Search Report from corresponding European Application No. 19209439.9 dated Feb. 27, 2020.

*Primary Examiner* — Jared Fureman
*Assistant Examiner* — Aqeel H Bukhari
(74) *Attorney, Agent, or Firm* — Lando & Anastasi, LLP (57) ABSTRACT

According to one aspect, embodiments of the invention provide a UPS comprising a plurality of inputs, a PFC converter configured to convert 3-phase input power into DC power, an inverter coupled to a positive DC bus and a negative DC bus and configured to convert the DC power received from the positive DC bus and the negative DC bus into output AC power, a first output configured to provide a first portion of the output AC power from the inverter to a load, a second output configured to provide a second portion of the output AC power from the inverter to the load, a third output configured to be selectively coupled to a neutral line via the inverter, and a controller configured to operate the inverter to generate current between the load and the neutral line via the third output and the inverter.

20 Claims, 3 Drawing Sheets

(56) References Cited

U.S. PATENT DOCUMENTS

2012/0025609 A1* 2/2012 West ................... H02M 5/4585
  307/31
2020/0011919 A1  1/2020 Mouridsen

* cited by examiner

3 PHASE UPS BUS BALANCER

BACKGROUND

1. Field of Invention

The present invention relates generally to Uninterruptible Power Supplies (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the invention is directed to an Uninterruptible Power Supply (UPS) comprising a plurality of inputs configured to be coupled to a three-phase AC power source and to receive 3-phase input power from the three-phase AC power source, a PFC converter coupled to the plurality of inputs and configured to convert the 3-phase input power into DC power, a positive DC bus coupled to the PFC converter, a negative DC bus coupled to the PFC converter, an inverter coupled to the positive DC bus and the negative DC bus and configured to convert the DC power received from the positive DC bus and the negative DC bus into output AC power, a first output coupled to the inverter and configured to be coupled to a load and to provide a first portion of the output AC power from the inverter to the load, a second output coupled to the inverter and configured to be coupled to the load, in parallel with the first output, and to provide a second portion of the output AC power from the inverter to the load, a neutral line configured to be coupled to the load, a third output configured to be coupled to the load and to be selectively coupled to the neutral line via the inverter, and a controller coupled to the inverter and configured to operate the inverter to couple the third output to the neutral line and to generate current between the load and the neutral line via the third output and the inverter.

According to one embodiment, the inverter comprises a first switch coupled between the third output and the neutral line, and in operating the inverter to generate current between the load and the neutral line via the third output and the inverter, the controller is further configured to operate the first switch to couple the third output to the neutral line. In one embodiment, the controller is further configured to operate the inverter to modulate the current generated between the load and the neutral line via the third output and the inverter to a desired level. In another embodiment, the controller is further configured to operate the inverter to modulate the current generated between the load and the neutral line via the third output and the inverter to be at a same level as current through the neutral line.

According to another embodiment, the controller is further configured to operate the inverter to modulate the current generated between the load and the neutral line via the third output and the inverter to be in counter-phase to output current of the first portion of the output AC power provided to the load via the first output and to output current of the second portion of the output AC power provided to the load via the second output. In one embodiment, the inverter further comprises a second switch coupled between the third output and the positive DC bus, and a third switch coupled between the third output and the negative DC bus, wherein in operating the inverter to modulate the current generated between the load and the neutral line via the third output and the inverter, the controller is further configured to operate the second switch to generate current between the positive DC bus and the third output and to operate the third switch to generate current between the negative DC bus and the third output.

According to one embodiment, the controller is further configured to operate the inverter as a bus balancer to transfer energy between the positive DC bus and the negative DC bus. In one embodiment, the UPS further comprises a positive bus capacitor coupled between the positive DC bus and the neutral line, wherein in operating the inverter as a bus balancer, the controller is further configured to operate the inverter to share ripple current in the positive DC bus capacitor with the negative DC bus. In another embodiment, the UPS further comprises a negative bus capacitor coupled between the negative DC bus and the neutral line, wherein in operating the inverter as a bus balancer, the controller is further configured to operate the inverter to share ripple current in the negative DC bus capacitor with the positive DC bus. In one embodiment, in operating the inverter as a bus balancer, the controller is further configured to operate the first switch to decouple the third output from the neutral line and to operate the second switch and the third switch to transfer energy between the positive DC bus and the negative DC bus.

Another aspect of the invention is directed to a method for operating a UPS comprising a plurality of inputs configured to be coupled to a three-phase AC power source, a PFC converter coupled to the plurality of inputs, a positive DC bus coupled to the PFC converter, a negative DC bus coupled to the PFC converter, an inverter coupled to the positive and negative DC busses, a first output coupled to the inverter, a second output coupled to the inverter, a third output coupled to the inverter, and a neutral line, wherein the method comprises coupling the first output and the second output to a load in parallel, coupling the neutral line to the load, coupling the third output to the neutral line, receiving three-phase input AC power at the plurality of inputs from the three-phase AC power source, converting, with the PFC converter, the three-phase input AC power into DC power, providing the DC power to the inverter via the positive and negative DC busses, converting the DC power from the positive and negative DC busses into output AC power, providing a first portion of the output AC power to the load via the first output, providing a second portion of the output AC power to the load via the second output, generating a first current between the neutral line and the load, and generating a second current between the load and the neutral line via the third output and the inverter.

According to one embodiment, generating the second current between the load and the neutral line via the third output and the inverter includes selectively coupling the third output to the neutral line via a first switch. In one embodiment, generating the second current between the load and the neutral line via the third output and the inverter includes modulating the second current to a desired level. In another embodiment, modulating the second current includes modulating the second current to be at the same level as the first current.

According to another embodiment, modulating the second current includes modulating the second current to be in counter-phase with current of the first portion of the output AC power provided to the load via the first output and with current of the second portion of the output AC power provided to the load via the second output. In one embodiment, modulating the portion of the second current includes generating, with a second switch, current between the third output and the positive DC bus and generating, with a third switch, current between the third output and the negative DC bus. In another embodiment, the method further comprises operating the inverter as a bus balancer to transfer energy between the positive DC bus and the negative DC bus. In one embodiment, operating the inverter as a bus balancer includes operating the first switch to decouple the third output from the neutral line, and operating the second switch and the third switch to transfer energy between the positive DC bus and the negative DC bus.

At least one aspect of the invention is directed to an Uninterruptible Power Supply (UPS) comprising a plurality of inputs configured to be coupled to a three-phase AC power source and to receive 3-phase input power from the three-phase AC power source, a PFC converter coupled to the plurality of inputs and configured to convert the 3-phase input power into DC power, a positive DC bus coupled to the PFC converter, a negative DC bus coupled to the PFC converter, an inverter coupled to the positive DC bus and the negative DC bus and configured to convert the DC power received from the positive DC bus and the negative DC bus into output AC power, a first output coupled to the inverter, a second output coupled to the inverter, a third output coupled to the inverter, a neutral line configured to be coupled to the load, and means for providing single phase output power to a load via the first output and the second output and for reducing stress in the neutral line by generating current between the third output and the load.

According to one embodiment, the UPS further comprises means for moving energy between the positive DC bus and the negative DC bus to share rippled current between the positive DC bus and the negative DC bus.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), are oftentimes used to provide regulated, uninterrupted power to sensitive and/or critical loads. Some UPS systems can be configured to draw power from a three-phase input and deliver power to only one output phase (i.e., 3:1 operation). For example, a UPS designed for 3:3 operation (i.e., three phase input and three phase output) can be used for 3:1 operation (i.e., three phase input and one phase output) by paralleling the three output phases of the UPS system and controlling the inverters of the UPS system in parallel. Theoretically, such a system can support the same load as in a 3:3 configuration; however, in actual practice, certain limitations may occur. For instance, a significant 50 Hz/60 Hz ripple current in the DC-bus capacitors of a 3-1 operated parallel-output UPS can be generated. Such ripple current can reduce capacitor lifetime and may result in the need to add additional capacitance on the DC-bus and/or de-rate the output power of the UPS. Furthermore, current in the neutral wire between the frame of the UPS and the power converter can be three times greater than the nominal phase current. This can result in the need to de-rate the output power of the UPS and/or increase the rating of the neutral wire.

In at least one embodiment, a UPS topology is described herein that can be operated in a 3:1 configuration while reducing DC-bus capacitor ripple current and reducing current in the neutral wire. The UPS is operated by coupling two output phases to a load in parallel and utilizing the third phase as a return line/bus balancer by connecting it to the neutral line.

Figure 1:
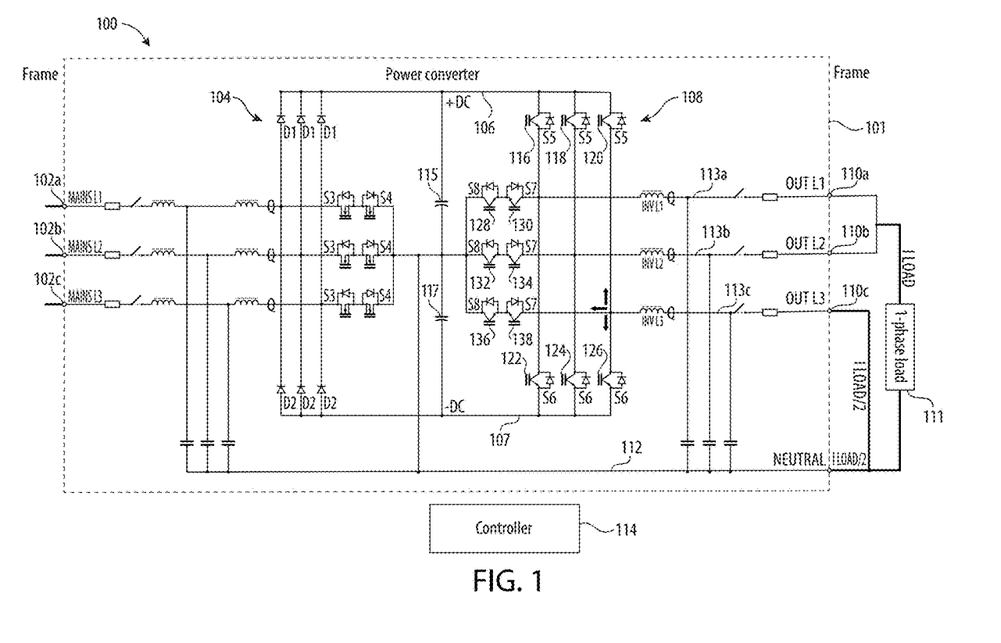
FIG. 1 is a schematic diagram of a UPS according to aspects described herein.

FIG. 1 is a schematic diagram of an online UPS 100 according to one aspect of the present invention. The UPS 100 includes a frame 101, plurality of inputs 102a-c, a converter 104, a positive DC bus 106, a negative DC bus 107, a first DC bus capacitor 115, a second DC bus capacitor 117, an inverter 108, a plurality of outputs (i.e., a first output 110a, a second output 110b, and a third output 110c), a neutral line 112, and a controller 114. Each of the plurality of inputs 102a-c is configured to be coupled to one phase of a three-phase power source. The converter 104 is coupled to each of the plurality of inputs 102a-c. The positive DC bus 106 and the negative DC bus 107 are coupled between the converter 104 and the inverter 108. The first DC bus capacitor 115 is coupled between the positive DC bus 106 and the neutral line 112. The second DC bus capacitor 117 is coupled between the negative DC bus 107 and the neutral line 112. The inverter 108 is also coupled to each of the plurality of outputs 110a-c. The first output 110a and the second output 110b are configured to be coupled to a load 111. The third output 110c is coupled to the neutral line 112.

In at least one embodiment, the inverter 108 includes a first plurality of switches coupled between the DC busses 106, 107 and the plurality of outputs 110a-c and a second plurality of switches coupled between the neutral line 112 and the plurality of outputs 110a-c. More specifically, in at least one embodiment, the first plurality of switches includes a first switch 116 coupled between the positive DC bus 106 and the first output 110a via a first phase line 113a, a second switch 118 coupled between the positive DC bus 106 and the second output 110b via a second phase line 113b, a third switch 120 coupled between the positive DC bus 106 and the third output 110c via a third phase line 113c, a fourth switch 122 coupled between the negative DC bus 107 and the first output 110a via the first phase line 113a, a fifth switch 124 coupled between the negative DC bus 107 and the second output 110b via the second phase line 113b, and a sixth switch 126 coupled between the negative DC bus 107 and the third output 110c via the third phase line 113c.

In at least one embodiment, the second plurality of switches includes a seventh switch 128 and eighth switch 130, coupled in series between the neutral line 112 and the first output 110a via the first phase line 113a, a ninth switch 132 and tenth switch 134, coupled in series between the neutral line 112 and the second output 110b via the second phase line 113b, and an eleventh switch 136 and twelfth switch 138, coupled in series between the neutral line 112 and the third output 110c via the third phase line 113c. According to at least one embodiment, each switch 116-138 is a Bipolar Junction Transistor (BJT); however, in other embodiments, another appropriate type of switch or transistor (e.g., a Metal-Oxide-Semiconductor Field-Effect Transistor (MOSFET)) may be utilized. In at least one embodiment, each switch 116-138 includes a parallel diode coupled between its collector and emitter.

The controller 114 is coupled to the inputs 102a-c, the outputs 110a-c, the converter 104, the positive DC bus 106, the negative DC bus 107, and the inverter 108. In at least one embodiment, the UPS 100 is also configured to be coupled to a battery (e.g., at the DC busses 106, 107 or via a DC/DC converter).

Each input 102a-c is configured to receive one phase of the three-phase power provided by the 3-phase power source. The controller 114 monitors the input AC power received by the inputs 102a-c and is configured to operate the UPS 100 in different modes of operation based on the status of the received input AC power. When AC power provided to the inputs 102a-c is acceptable (i.e., above an input power threshold), the controller 114 operates the UPS 100 in an online mode of operation. In the online mode of operation, AC power from the inputs 102a-c is provided to the converter 104. According to one embodiment, the converter 104 is a Power Factor Correction converter; however, in other embodiments, other types of converters may be utilized.

The controller 114 operates the converter 104 to convert the input AC power into DC power and provide the DC power to the positive DC bus 106 and the negative DC bus 107. In one embodiment, DC power is also provided from the converter 104 to a battery to charge the battery. In another embodiment, DC power from the DC busses 106, 107 is provided to the battery via a DC/DC converter to charge the battery. In the online mode of operation, the inverter 108 receives DC power from the positive DC bus 106 and the negative DC bus 107, and the controller 114 operates the inverter 108 to convert the DC power into regulated AC power and provide regulated AC power to a load 111 coupled to the first output 110a (and the first phase line 113a) and the second output 110b (and the second phase line 113b).

When AC power provided to the inputs 102a-c is not acceptable (i.e., below an input power threshold), the controller 114 operates the UPS 100 in a backup mode of operation. In the backup mode of operation, DC power from a DC power source (e.g., a battery) is regulated (e.g., by the converter 104 or a DC/DC converter) and provided to the positive DC bus 106 and the negative DC bus 107. The inverter 108 receives the DC power from the positive DC bus 106 and the negative DC bus 107, and the controller 114 operates the inverter 108 to convert the DC power into regulated AC power and provide the regulated AC power to the first output 110a via the first phase line 113a and the second output 110b via the second phase line 113b.

As described above, in the online and backup modes of operation, regulated output AC power is provided to a load 111 via the first phase line 113a/first output 110a and the second phase line 113b/second output 110b. The inverter 108 is configured to provide a first portion of the output AC power (e.g., a first current) to the load 111 via the first phase line 113a/first output 110a and to provide a second portion of the output AC power (e.g., a second current) to the load 111 via the second phase line 113b/second output 110b. The first portion and the second portion are combined to provide the regulated output AC power to the load 111.

In the online or backup mode of operation, the inverter 108 is also operated by the controller 114 to reduce current in the neutral line 112. More specifically, current in the neutral line 112 can be reduced by operating the inverter 108 to generate current between the load 111 and the neutral line 112 via the third output 113c and the inverter 108. Current between the load 111 and the third output 110c can be controlled by operating the eleventh switch 136, the twelfth switch 138, the third switch 120, and the sixth switch 126. For example, in the online or backup mode of operation, if a positive current in the third output 113c is requested by the controller 114, the current can be modulated by turning the eleventh switch 136 constantly on and operating the third switch 120 with a Pulse Width Modulation (PWM) signal. Likewise, if a negative current in the third output 113c is requested by the controller 114, the current can be modulated by turning the twelfth switch 138 constantly on and operating the sixth switch 126 with a Pulse Width Modulation (PWM) signal.

By selectively controlling the third switch 120, the sixth switch 126, the eleventh switch 136, and the twelfth switch 138 to direct current between the third output 110c and the neutral line 112, the third phase line 113c can be operated to draw current (i.e., current through the output 110c) at a desired level and in counter-phase to the current provided to the load by the first phase line 113a and the second phase line 113b (i.e., the current through the first output 110a and the current through the second output 110b).

Thereby a first portion of the return current between the load 111 and the system 100 is passed directly between the neutral line 112 and the load 111 and a second portion of the return current between the load 111 and the system 100 is passed through the third phase line 113c. In at least one embodiment, half of the load current (ILOAD/2) is generated in the neutral line 112 and half of the load current (ILOAD/2) is generated in the third phase line 113c. However, in other embodiments, the division of the load current can be configured differently. By splitting the returning load current between the neutral line 112 and the third phase line 113c, stress on the neutral line 112 can be reduced.

According to one embodiment, the third phase line 113c of the inverter 108 can also be utilized as a bus balancer to move energy between the positive DC bus 106 and the negative DC bus 107. By moving energy between the positive DC bus 106 and the negative DC bus 107, ripple current in the DC-bus capacitors 115, 117 can partially be shared between the two DC busses 106, 107, thus lowering the RMS ripple current in each capacitor 115, 117. For example, in at least one embodiment, when bus balancing is desired the controller 114 operates the eleventh switch 136 and the twelfth switch 138 to open and operates the third switch 120 and the sixth switch 126 to transfer desired energy between the positive DC bus 106 and the negative DC bus 107. By transferring energy between the busses 106, 107, ripple current in the DC-bus capacitors 115, 117 can be shared between the two DC busses 106, 107.

Figure 2:
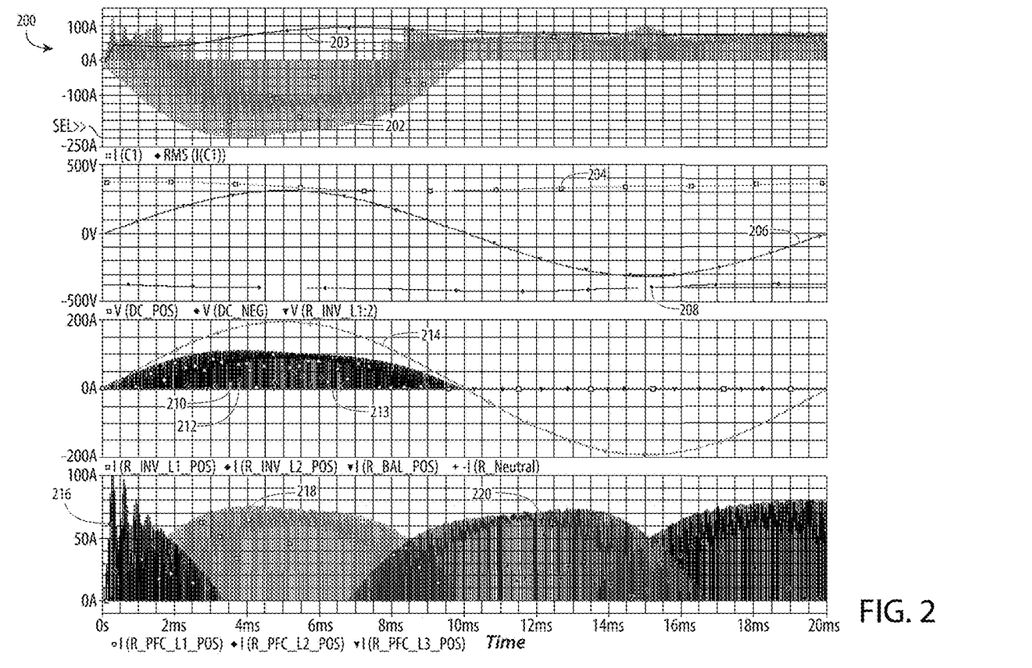
FIG. 2 is a graph illustrating operation of the UPS according to one embodiment described herein.

Operation of the UPS 100 is discussed in greater detail below with respect to FIGS. 2-3. FIG. 2 is a graph 200 illustrating operation of the UPS where the first phase line 113a and the second phase line 113b are providing power to the load 111 and the third phase line 113c is inactive. In a first window, the graph 200 includes a first trace 202 illustrating ripple current in the positive DC-bus capacitor 115 and a second trace 203 illustrating RMS ripple current (e.g., about 71 A). The first trace 202 includes a large 50 Hz ripple during the positive half-period. In a second window, the graph 200 includes a third trace 204 illustrating voltage on the positive DC bus 106, a fourth trace 208 illustrating voltage on the negative DC bus 107, and a fifth trace 206 illustrating output voltage provided to the load 111. There is a voltage ripple on each bus 106, 107 (e.g., around 68V peak-peak per DC-bus).

In a third window, the graph 200 includes a sixth trace 210 illustrating current drawn from the positive DC-bus 106 by the first phase line 113a to the first output 110a, a seventh trace 212 illustrating current drawn from the positive DC-bus 106 by the second phase line 113b to the second output 110b, and an eighth trace 213 illustrating current through the third phase line 113c to the third output 110c. The current through the first phase line 113a is the same as the current through the second phase line 113b, while the current through the third phase line 113c is zero. Also in the third window, the graph 200 includes a ninth trace 214 illustrating current through the neutral line 112. The current through the neutral line is equal to the load current. In a fourth window, the graph 200 includes a tenth trace 216, an eleventh trace 218, and a twelfth trace 220, each illustrating the current provided to the positive DC bus 106 by one of the input phases 102a-c.

Figure 3:
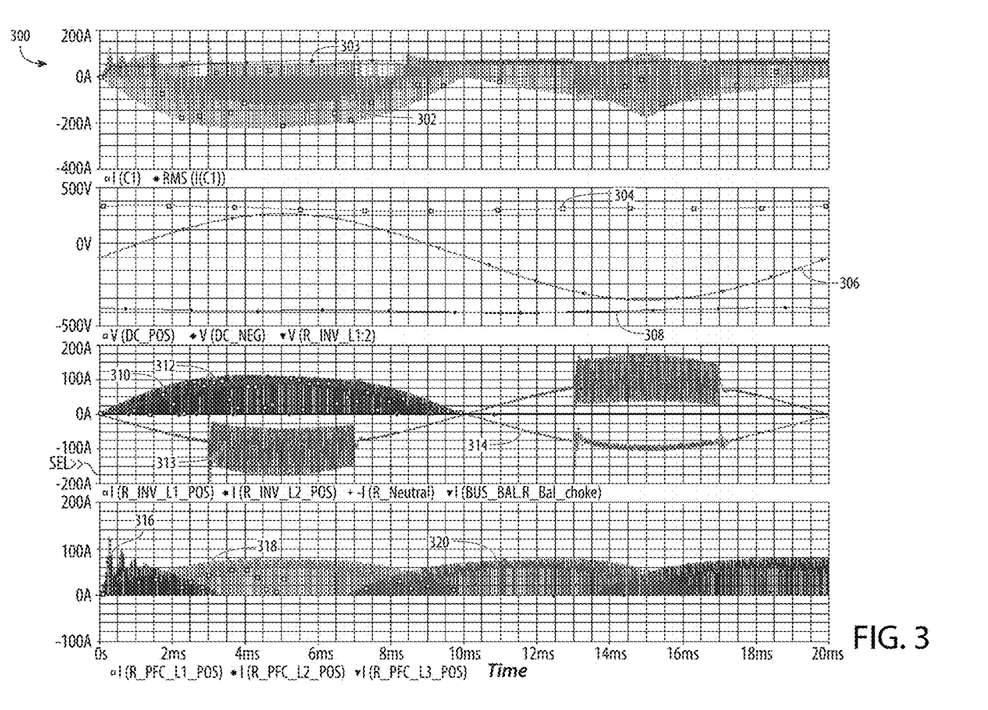
FIG. 3 is a graph illustrating operation of the UPS according to another embodiment described herein.

FIG. 3 is a graph 300 illustrating operation of the UPS where the first phase line 113a and second phase line 113 are providing power to the load 111 and the third phase line 113c is active (e.g., as discussed above). In a first window, the graph 300 includes a first trace 302 illustrating ripple current in the positive DC-bus capacitor 115 and a second trace 303 illustrating RMS ripple current. In a second window, the graph 300 includes a third trace 304 illustrating voltage on the positive DC bus 106, a fourth trace 308 illustrating voltage on the negative DC bus 107, and a fifth trace 306 illustrating output voltage provided to the load 111. There is a voltage ripple on each bus 106, 107 (e.g., around 43V peak-peak per DC-bus).

In a third window, the graph 300 includes a sixth trace 310 illustrating current drawn from the positive DC-bus 106 by the first phase line 113a to the first output 110a, a seventh trace 312 illustrating current drawn from the positive DC-bus 106 by the second phase line 113b to the second output 110b, and an eighth trace 313 illustrating current through the third phase line 113c to the third output 110c. The current through the first phase line 113a is the same as the current through the second phase line 113b. Also in the third window, the graph 300 includes a ninth trace 314 illustrating current through the neutral line 112. In a fourth window, the graph 300 includes a tenth trace 316, an eleventh trace 318, and a twelfth trace 320, each illustrating the current provided to the positive DC bus 106 by one of the input phases 102a-c.

As discussed above, the third phase line 113c can be operated to reduce current in the neutral line 112. For example, as shown in the third window of the graph 300, the eleventh switch 136, the twelfth switch 138, the third switch 120, and the sixth switch 126 are operated such that the current through the third phase line 113c (i.e., the eighth trace 313) is in opposite phase to the current 314 in the neutral line 112. The current 314 through the neutral line 112 is thus reduced in half (e.g., when compared to the graph 200 of FIG. 2) and the stress on the neutral line 112 is reduced.

As also discussed above, the third phase line 113c of the inverter 108 can be utilized as a bus balancer to move energy between the positive DC bus 106 and the negative DC bus 107. For example, as shown in the third window of FIG. 3, the third phase line 113c is operated as a bus balancer from T=3 ms to T=7 ms, where the eleventh switch 136 and the twelfth switch 138 are operated to open and the third switch 120 and the sixth switch 126 are operated to transfer energy between the positive DC bus 106 and the negative DC bus 107. By transferring energy between the busses 106, 107, ripple current in the DC-bus capacitors 115, 117 can be shared between the two DC busses 106, 107. For instance, as shown in FIG. 3, by sharing ripple current between the DC busses 106, 107, the RMS current 303 in the positive DC bus capacitor 115 is reduced from 71 A (e.g., from FIG. 2) to 63 A. According to at least one embodiment, by transferring energy between the busses 106, 107, the DC-bus ripple voltage can also be reduced. For example, as shown in FIG. 3, the DC-bus ripple voltage has dropped from 68V peak-peak (e.g., from FIG. 2) to 43V. In at least one embodiment, by transferring energy between the busses 106, 107, the 100 Hz equivalent ripple current is also reduced (e.g., when compared to the implementation of FIG. 2).

As discussed above, the controller 114 is configured to monitor and control operation of the UPS 100. Using data stored in associated memory, the controller 114 is operable to execute one or more instructions that may result in the manipulation of one or more switches' conductive states. In some examples, the controller 114 can include one or more processors or other types of controllers. The controller 114 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

As described above, the UPS 100 is configured to operate in a 3:1 configuration where power is provided to a load 111 via two phase lines 113a, 113b and the third phase line 113c is operated as a return line/bus balancer. In at least one embodiment, the first output 110a and the second output 110b are coupled together within the frame 101 of the UPS and the third output 110c is coupled to the neutral line 112 within the frame 101. According to another embodiment, the UPS 100 can also be configured to operate in a 3:1 configuration where all three phase lines are coupled to provide power to a load. For example, in such an embodiment, the first output 110a, the second output 110b, and the third output 110c can be coupled together within the frame 101 of the UPS.

As described above, a UPS topology is described herein that can be operated in a 3:1 configuration while reducing DC-bus capacitor ripple current and reducing current in the neutral wire. The UPS is operated by coupling two output phases to a load in parallel and utilizing the third phase as a bus balancer by connecting it to the neutral line. According to at least one embodiment, by implementing the bus-balancer configuration discussed above, the output power of a UPS operating in 3:1 configuration can be increased by around 50% (e.g., when compared to a UPS in 3:1 configuration that does not implement the bus-balancer configuration).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) comprising:
a plurality of inputs configured to be coupled to a three-phase AC power source and to receive 3-phase input power from the three-phase AC power source;
a PFC converter coupled to the plurality of inputs and configured to convert the 3-phase input power into DC power;
a positive DC bus coupled to the PFC converter;
a negative DC bus coupled to the PFC converter;
an inverter coupled to the positive DC bus and the negative DC bus and configured to convert the DC power received from the positive DC bus and the negative DC bus into output AC power;
a first output coupled to the inverter and configured to be coupled to a load and to provide a first portion of the output AC power from the inverter to the load;
a second output coupled to the inverter and configured to be coupled to the load, in parallel with the first output, and to provide a second portion of the output AC power from the inverter to the load;
a neutral line configured to be coupled to the load;
a third output configured to be coupled to the load and to be selectively coupled to the neutral line via the inverter; and
a controller coupled to the inverter and configured to operate the inverter to couple the third output to the neutral line and to generate current between the load and the neutral line via the third output and the inverter.

2. The UPS of claim 1, wherein the inverter comprises a first switch coupled between the third output and the neutral line, and wherein in operating the inverter to generate current between the load and the neutral line via the third output and the inverter, the controller is further configured to operate the first switch to couple the third output to the neutral line.

3. The UPS of claim 2, wherein the controller is further configured to operate the inverter to modulate the current generated between the load and the neutral line via the third output and the inverter to a desired level.

4. The UPS of claim 3, wherein the controller is further configured to operate the inverter to modulate the current generated between the load and the neutral line via the third output and the inverter to be at a same level as current through the neutral line.

5. The UPS of claim 3, wherein the controller is further configured to operate the inverter to modulate the current generated between the load and the neutral line via the third output and the inverter to be in counter-phase to output current of the first portion of the output AC power provided to the load via the first output and to output current of the second portion of the output AC power provided to the load via the second output.

6. The UPS of claim 5, wherein the inverter further comprises:
a second switch coupled between the third output and the positive DC bus; and
a third switch coupled between the third output and the negative DC bus,
wherein in operating the inverter to modulate the current generated between the load and the neutral line via the third output and the inverter, the controller is further configured to operate the second switch to generate current between the positive DC bus and the third output and to operate the third switch to generate current between the negative DC bus and the third output.

7. The UPS of claim 6, wherein the controller is further configured to operate the inverter as a bus balancer to transfer energy between the positive DC bus and the negative DC bus.

8. The UPS of claim 7, further comprising:
a positive bus capacitor coupled between the positive DC bus and the neutral line,
wherein in operating the inverter as a bus balancer, the controller is further configured to operate the inverter to share ripple current in the positive DC bus capacitor with the negative DC bus.

9. The UPS of claim 8, further comprising:
a negative bus capacitor coupled between the negative DC bus and the neutral line,
wherein in operating the inverter as a bus balancer, the controller is further configured to operate the inverter to share ripple current in the negative DC bus capacitor with the positive DC bus.

10. The UPS of claim 7, wherein in operating the inverter as a bus balancer, the controller is further configured to operate the first switch to decouple the third output from the neutral line and to operate the second switch and the third switch to transfer energy between the positive DC bus and the negative DC bus.

11. A method for operating a UPS comprising a plurality of inputs configured to be coupled to a three-phase AC power source, a PFC converter coupled to the plurality of inputs, a positive DC bus coupled to the PFC converter, a negative DC bus coupled to the PFC converter, an inverter coupled to the positive and negative DC busses, a first output coupled to the inverter, a second output coupled to the inverter, a third output coupled to the inverter, and a neutral line, wherein the method comprises:

coupling the first output and the second output to a load in parallel;

coupling the neutral line to the load;

coupling the third output to the neutral line;

receiving three-phase input AC power at the plurality of inputs from the three-phase AC power source;

converting, with the PFC converter, the three-phase input AC power into DC power;

providing the DC power to the inverter via the positive and negative DC busses;

converting the DC power from the positive and negative DC busses into output AC power;

providing a first portion of the output AC power to the load via the first output;

providing a second portion of the output AC power to the load via the second output;

generating a first current between the neutral line and the load; and generating a second current between the load and the neutral line via the third output and the inverter.

12. The method of claim 11, wherein generating the second current between the load and the neutral line via the third output and the inverter includes selectively coupling the third output to the neutral line via a first switch.

13. The method of claim 12, wherein generating the second current between the load and the neutral line via the third output and the inverter includes modulating the second current to a desired level.

14. The method of claim 13, wherein modulating the second current includes modulating the second current to be at the same level as the first current.

15. The method of claim 13, wherein modulating the second current includes modulating the second current to be in counter-phase with current of the first portion of the output AC power provided to the load via the first output and with current of the second portion of the output AC power provided to the load via the second output.

16. The method of claim 15, wherein modulating the portion of the second current includes generating, with a second switch, current between the third output and the positive DC bus and generating, with a third switch, current between the third output and the negative DC bus.

17. The method of claim 16, further comprising operating the inverter as a bus balancer to transfer energy between the positive DC bus and the negative DC bus.

18. The method of claim 17, wherein operating the inverter as a bus balancer includes:

operating the first switch to decouple the third output from the neutral line; and operating the second switch and the third switch to transfer energy between the positive DC bus and the negative DC bus.

19. An Uninterruptible Power Supply (UPS) comprising:

a plurality of inputs configured to be coupled to a three-phase AC power source and to receive 3-phase input power from the three-phase AC power source;

a PFC converter coupled to the plurality of inputs and configured to convert the 3-phase input power into DC power;

a positive DC bus coupled to the PFC converter;

a negative DC bus coupled to the PFC converter;

an inverter coupled to the positive DC bus and the negative DC bus and configured to convert the DC power received from the positive DC bus and the negative DC bus into output AC power;

a first output coupled to the inverter;

a second output coupled to the inverter;

a third output coupled to the inverter;

a neutral line configured to be coupled to the load; and means for providing single phase output power to a load via the first output and the second output and for reducing stress in the neutral line by generating current between the third output and the load.

20. The UPS of claim 19, further comprising means for moving energy between the positive DC bus and the negative DC bus to share rippled current between the positive DC bus and the negative DC bus.

* * * * *